United States Patent
Jeong

(10) Patent No.: US 12,219,903 B2
(45) Date of Patent: Feb. 11, 2025

(54) MUSHROOM CASING MIX

(71) Applicant: Sun Gro Horticulture Canada Ltd., Seba Beach (CA)

(72) Inventor: Ka Yeon Jeong, Columbus, OH (US)

(73) Assignee: Sun Gro Horticulture Canada Ltd., Alberta (CA)

( * ) Notice: Subject to any disclaimer, the term of this patent is extended or adjusted under 35 U.S.C. 154(b) by 807 days.

(21) Appl. No.: 17/486,999

(22) Filed: Sep. 28, 2021

(65) Prior Publication Data

US 2023/0094332 A1    Mar. 30, 2023

(51) Int. Cl.
| | |
|---|---|
| A01G 18/20 | (2018.01) |
| A01G 18/40 | (2018.01) |
| C05D 9/00 | (2006.01) |
| C05F 11/00 | (2006.01) |

(52) U.S. Cl.
CPC .............. *A01G 18/20* (2018.02); *A01G 18/40* (2018.02); *C05D 9/00* (2013.01); *C05F 11/00* (2013.01)

(58) Field of Classification Search
CPC .......... A01G 18/00; A01G 18/20; A01G 18/40
USPC ............................................. 47/1.1, 58.1 SC
See application file for complete search history.

(56) References Cited

U.S. PATENT DOCUMENTS

| | | | |
|---|---|---|---|
| 3,640,696 A | 2/1972 | Goldmann | |
| 4,337,594 A | 7/1982 | Hanacek | |
| 4,443,969 A | 4/1984 | Hanacek | |
| 4,646,466 A | 3/1987 | Olah | |
| 5,503,647 A | 4/1996 | Dahlberg | |
| 5,888,803 A | 3/1999 | Starkey | |
| 6,073,388 A | 6/2000 | Kananen | |
| 6,074,988 A | 6/2000 | King | |
| 6,205,703 B1 | 3/2001 | Rettig | |
| 6,254,654 B1 | 7/2001 | Van | |
| 6,408,568 B1 * | 6/2002 | Kusey | C09K 17/52 47/9 |
| 7,571,565 B2 | 8/2009 | Noble | |
| 8,695,275 B2 * | 4/2014 | Havrda | A01C 21/00 47/59 S |
| 9,221,722 B2 | 12/2015 | Miranda | |

(Continued)

FOREIGN PATENT DOCUMENTS

| | | |
|---|---|---|
| EP | 409186 | 12/1993 |
| EP | 2282628 | 8/2016 |

(Continued)

OTHER PUBLICATIONS

Almeida, G. D., et al., Calcium silicate and organic mineral fertilizer increase the resistance of tomato plants to Frankliniella schultzei; May 5, 2009; Phytoparasitica 37:225-230.

(Continued)

*Primary Examiner* — David J Parsley
(74) *Attorney, Agent, or Firm* — Adam K Sacharoff; Much Shelist, PC

(57) ABSTRACT

There is shown a mushroom casing mix having a core material of up to 100% sphagnum peat moss and a concentration mix of wollastonite and dolomitic limestone in a ratio of 10:85 per 1 yard of core material. After adding the concentration mix to the core material, the mushroom casing mix is configured to have an enhanced ability to maintain a pH between 7.5 and 8.2 within 14 days after the concentration mix is added to the core material.

6 Claims, 2 Drawing Sheets

(56) References Cited

U.S. PATENT DOCUMENTS

| | | |
|---|---|---|
| 9,315,428 B2 | 4/2016 | Miranda |
| 10,058,092 B2 | 8/2018 | Miresmailli |
| 2007/0294939 A1 | 12/2007 | Spear |
| 2019/0133133 A1 | 5/2019 | Rabot |
| 2020/0229360 A1 | 7/2020 | Schoener |

FOREIGN PATENT DOCUMENTS

| | | |
|---|---|---|
| JP | 2128623 | 5/1990 |
| JP | 3205083 | 9/2001 |
| WO | 2001058831 | 8/2001 |
| WO | 2004007403 | 1/2004 |
| WO | 2005097947 | 10/2005 |
| WO | 2016092566 | 8/2017 |
| WO | 2018175821 | 9/2018 |

OTHER PUBLICATIONS

Castro GSA, et al., Effects of superficial liming and silicate application on soil fertility and crop yield under rotation; Jan. 14, 2013; Geoderma 195-196 (2013).

Mansano Sarto, M.V. et al., Effects of calcium and magnesium silicate on the absorption of silicon and nutrients in wheat; May 14, 2018; Ciencias Agrarias, vol. 40, No. 1, 2019.

Crooks, Regan, et al. The benefits of silicon fertiliser for sustainably increasing crop productivity; Beijing 2011 The 5th International Conference on Silicon in Agriculture.

Cardoso, Rossana et al., Influence of Calcium Silicate on the Chemical Properties of Pleurotus ostreatus var. florida (Jacq.) P. Kumm; Nov. 19, 2020, Journal of Fungi, 6, 299.

Dquo; Vansil W-10—Calcium + Silica rdquo; buildasoil.com (Accessed Jan. 18, 2021).

Jeong, Ka, Establishment and Stabilization of pH in Container Root Substrate, Jul. 23, 2010, NC State University Libraries, http://www.lib.ncsu.edu/resolver/1840.16/6603.

Notice of Allowance, CA Patent Application 3135778, filed Oct. 25, 2021; Date of Notice Sep. 8, 2023, corresponding sister application to present application.

\* cited by examiner

FIG. 1 TABLE 1
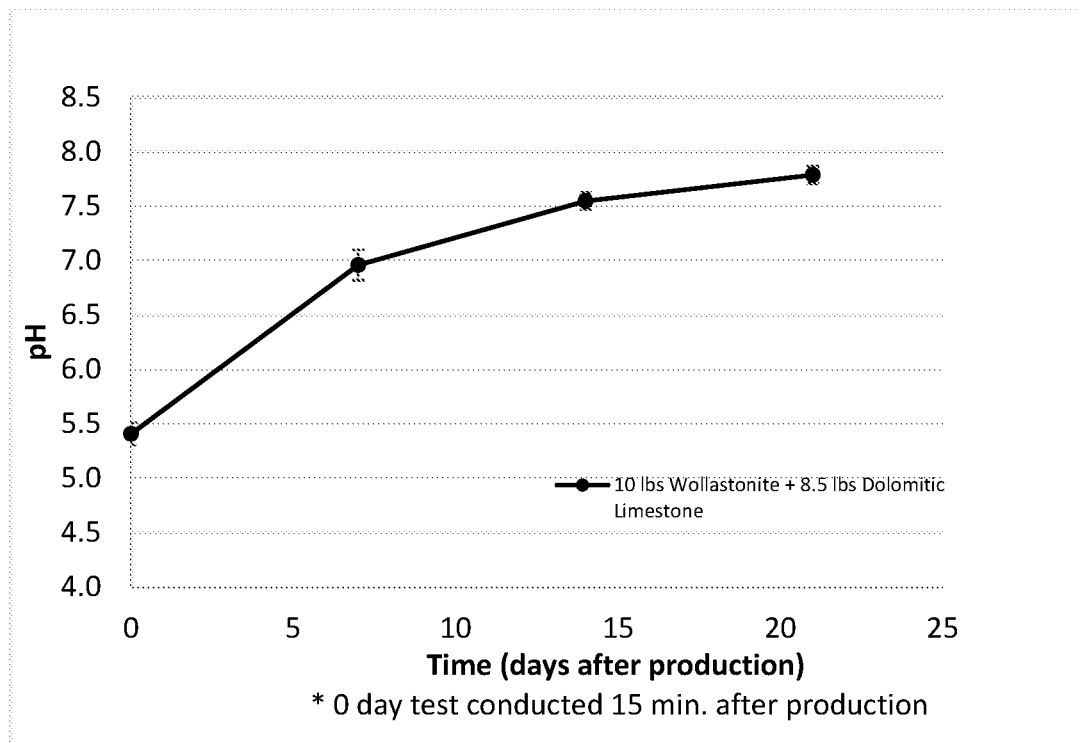
FIG. 2 TABLE 2
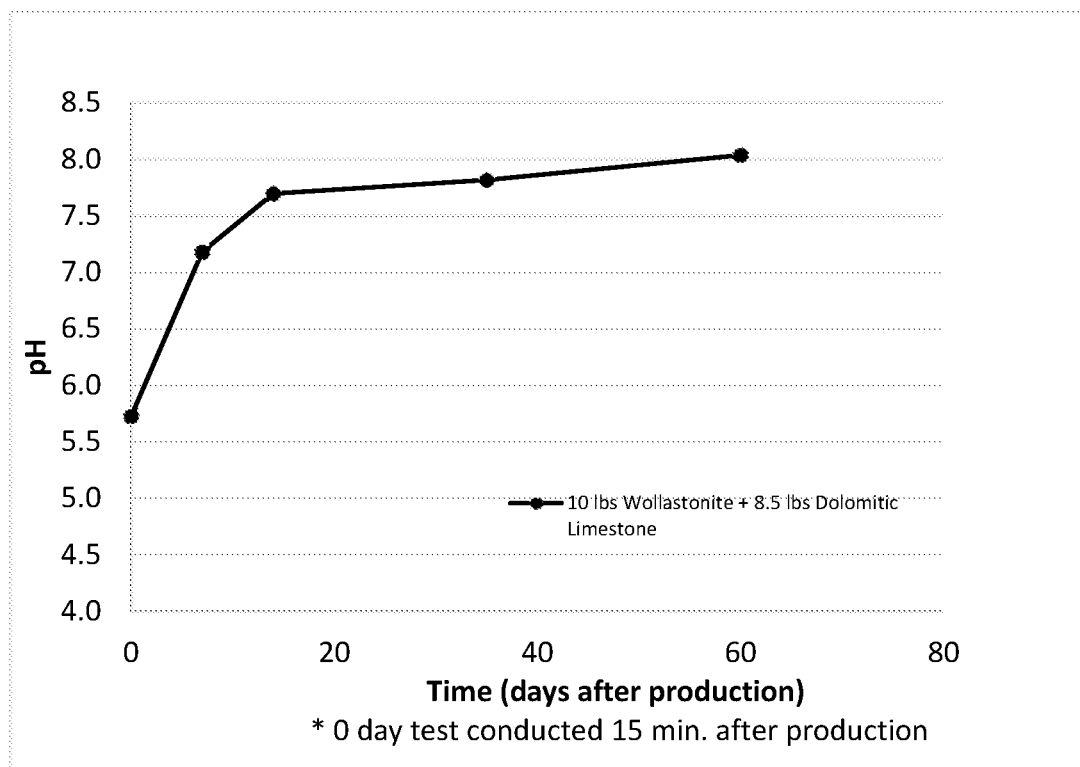

FIG. 3. TABLE3
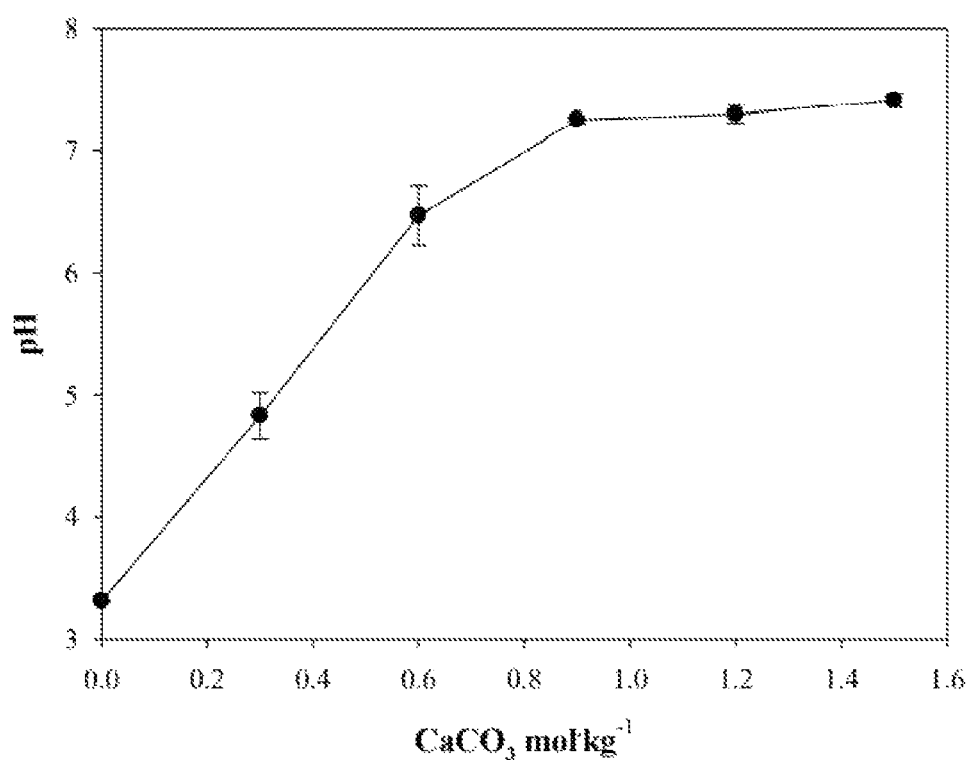

MUSHROOM CASING MIX

FIELD OF THE INVENTION

The subject invention relates generally to the cultivation of mushrooms. More specifically, it deals with novel compositions and processes for what is called "casing" or "capping" material used in the cultivation of mushrooms. Casing or capping is the operation of covering mushroom growth beds with a thin layer of soil, peat or a combination thereof.

BACKGROUND OF THE INVENTION

As with any agricultural product, mushroom quality and production efficiency are dependent upon environmental conditions such as temperature, humidity, $CO_2$ level, air quality and the quality of compost and casing mix such as nutrition level, pH, moisture content. Carefully regulated control of the above factors, coupled with improved materials, methods, planned compost supplementation programs, on-farm protective measures, sanitation and disinfecting programs are a few of the steps being taken during the composting, spawning, casing, pinning, and cropping stages to ensure higher marketable qualities.

Mushrooms, typically, are grown in discrete, dark houses, in large, flat wooden beds stacked 8 to 10 feet high and about 2 feet apart. These mushroom houses are maintained under carefully controlled environmental conditions. The beds are prepared by filling them to a depth of about 6 to 10 inches, with a carefully processed mushroom compost. The mushroom spores are either mixed in with the compost prior to filling the beds or are implanted as spawn in the compost after filling the beds. The compost must not be too moist as otherwise the spawn is killed by excessive moisture.

About 14 to 21 days after the beds have been spawned and the spawn is spreading in all directions, the beds are ready for "casing" or "capping". A casing layer is very important to ensure a good healthy crop of mushrooms. The casing acts as a support for the heavy mushroom caps so that they do not fall over and break the delicate roots through which they receive their sustenance. Casing prevents the surface of the compost layer from drying out. This is particularly critical because it is extremely tricky to replace the moisture in the compost layer without killing the spawn at that level.

Mushroom growers have changed the type of casing from soil to a peat moss. The peat moss comprises weed-free, soil-borne pathogen free, and lighter material with a preferred moisture holding capacity. Also, a peat-based casing mix can be well distributed to provide uniform layer to cover the mushroom compost bed. This is extremely important to produce consistent quality of mushrooms at the same rate and same timeline. The casing materials are produced by mechanically blending peat moss with different liming materials regionally sourced such as sugar beet lime and ground limestone, or with reclaimed compost by mushroom growers. However, improvements to preparing a casing mix for mushroom cultivation continue to be sought.

BRIEF DESCRIPTION OF THE FIGURES

FIG. 1 illustrates in TABLE 1 the pH response curve of Sphagnum peat moss as a function of time.

FIG. 2 illustrates in TABLE 2 the pH response curve of Sphagnum peat moss as a function of time.

FIG. 3 illustrates in TABLE 3 that dolomitic limestone has limited solubility in water to neutralize the acidity.

SUMMARY OF THE INVENTION

In one embodiment of the present invention there is provided a mushroom casing mix defined to include a core material of up to 100% sphagnum peat moss and a concentration mix of wollastonite and dolomitic limestone in a ratio of 10:8.5 per 1 yard of core material. After combining the concentration mix to the core material, the mushroom casing mix is configured to have an enhanced ability to maintain a pH between 7.5 and 8.2 within 14 days of the concentration mix being added to the core material.

In an aspect of the invention, the enhanced ability of the mushroom casing mix is configured to maintain the pH range between 7.5 and 8.2 within 14 days after the concentration mix is added to at least 60 days after the concentration mix is added.

In another embodiment of the present invention, there is provided a mushroom casing mix comprising a core material of up to 100% sphagnum peat moss and a concentration mix of wollastonite and dolomitic limestone. The moisture content of the core material is configured to about 54.4% while the concentration of wollastonite in the mushroom casing remix is about 3.82% by weight and the concentration of dolomitic limestone in the mushroom casing mix is about 3.25% by weight. After combining, the concentration mix to the core material, the mushroom casing mix is configured to have an enhanced ability to maintain a pH between 7.5 and 8.2 after 14 days of the concentration mix being added to the core material.

In another aspect of this embodiment, the enhanced ability of the mushroom casing mix to maintain the pH range between 7.5 and 8.2 extends from 14 days after the concentration mix is added to at least 60 days after the concentration mix is added.

In another embodiment of the present invention, there is provided a method of reaching a pH range between 7.5-8.2 in a mushroom casing mix. The method includes providing a core material of up to 100% sphagnum peat moss; adding a concentration mix of wollastonite and dolomitic limestone; and configuring the ratio of the wollastonite and dolomitic limestone at a ratio of 10:8.5 per 1 yard of core material to provide the mushroom casing mix with an enhanced ability to maintain a pH between 7.4 and 8.2 for a period of time after the concentration mix is added to the core material, and wherein the period of time is 14 days to about at least 60 days.

In yet another embodiment of the present invention there is provided a method of reaching a pH range between 7.5-8.2 in a mushroom casing mix. The method includes the steps of providing a core material of up to 100% sphagnum peat moss; adding a concentration mix of wollastonite and dolomitic limestone; and wherein when the moisture content of the core material is configured to about 54.4% the concentration of wollastonite in the mushroom casing mix is 3.82% by weight and the concentration of dolomitic limestone in the mushroom casing mix is about 3.25% by weight. After combining the mushroom casing mix has an enhanced ability to maintain a pH between 7.4 and 8.2 for a period of time after the concentration mix is added to the core material, and wherein the period of time is 14 days to about at least 60 days.

Numerous other advantages and features of the invention will become readily apparent from the following detailed description of the invention and the embodiments thereof, and from the claims.

DETAILED DESCRIPTION OF THE DRAWINGS

While the invention is susceptible to embodiments in many different forms, there are shown in the drawings and will be described in detail herein the preferred embodiments of the present invention. It should be understood, however, that the present disclosure is to be considered an exemplification of the principles of the invention and is not intended to limit the spirit or scope of the invention of the embodiments illustrated.

There is provided a Mushroom casing mix, which is a top-dressing layer placed directly to the spawn-run compost. The present embodiments seek an optimal mushroom casing mix with a pH range between, 7.5-8.2. This target pH range is about two units of pH higher than the typical target pH levels for horticultural substrate mixes.

As a liming material, Wollastonite (Calcium silicate, $CaSiO_3$) is used to adjust the pH of acidic Sphagnum Peat moss (average natural pH 4.5) in addition to dolomitic limestone ($CaMg(CO_3)_2$) to achieve the high target pH range. According to the results of two trials conducted, the pH of Sphagnum peat moss was adjusted within the target optimal pH range, 7.5-7.9 within 14 days after production. Wollastonite is an effective liming mineral to increase pH of Sphagnum peat moss up to 8.0 in addition to dolomitic limestone. The Trials show the pH response curve of Sphagnum peat moss as a function of time after production at the rate of 10 lbs Wollastonite and 8.5 lbs dolomitic limestone per 1 cubic yard of sphagnum peat moss.

In Tables 1 and 2, the pH response curve of Sphagnum peat moss as a function of time after production with 10 lbs Wollastonite and 8.5 lbs dolomitic limestone shows the optimal target pH is achieved after about 14 days and which lasts through 60 days.

Dolomitic limestone has been used as a key liming material to adjust acidic horticultural substrate components such as Sphagnum peat moss and processed bark. However, the dolomitic limestone has limited solubility in water to neutralize the acidity. It has been reported in the Establishment and Stabilization of pH in Container Root Substrate that the pH of Sphagnum peat moss incubated with different rates of $CaCO_3$ was not linearly increased, Table 3. The pH did not increase as the concentration of $CaCO_3$ increases from 0.9 to 1.5 mol per kg of dried sphagnum peat moss (equivalent to 8.5 lb to 14.2 lb of $CaCO_3$ per cubic yard of sphagnum peat moss). The maximum pH of Sphagnum peat moss amended with $CaCO_3$ was below 7.5. $CaCO_3$ used in this study was fine powder grade and 98% purity. The horticultural grade dolomitic limestone materials are much coarser and have less purity compared to the lab grade $CaCO_3$ use in the study. Therefore, when dolomitic limestone is amended with Sphagnum peat moss, the highest level will be significantly lower than 7.5 at the same rate of dolomitic limestone. Due to these chemical equilibrium reactions of calcium carbonate, the addition of Wollastonite is essential to raise the pH above 7.5 to engineer the mushroom casing mix.

As previously used in other patents, such as U.S. Pat. No. 6,074,988, the use of Wollastonite was a source of soluble silicon as a beneficial substance for plant growth. The present application uses Wollastonite as a source of liming material to achieve a higher pH range than what dolomitic lime itself can adjust the pH of Sphagnum peat moss, with a pH range between 7.5-8.2. Having a product with a pH range of 3.8-7.6 (as disclosed previously) is very different from one that has a range of 7.5 to 8.2. The average value of the prior art mix is 5.7, while the present invention has an average pH value of around 7.9, which is above the prior art pH range. That is a significant difference from an agronomic standpoint. Specifically, the product increases the amount of Wollastonite to maintain the higher range of pH in the new mix and changing its main function to that of a liming agent as opposed to a source of silicon for plant growth. The higher nominal target of the new mix was specifically developed for the mushroom market.

Based on Table 1 and 2, the formula of the mushroom casing mix is 10 lb of Wollastonite and 8.5 lb of dolomitic limestone per one cubic yard of Sphagnum peat moss. Based on the average bulk density of Sphagnum peat moss at the average 54.4% of moisture, 1 cubic yard of Sphagnum Peat weights 243 lbs per cubic yard (=144.1 kg per cubic meter). Therefore, the concentration info for wollsatonite and dolomitic limestone in the mushroom casing mix by weight is as provided as follows:

The concentration of Wollastonite in mushroom casing mix is 3.82%, by weight, at 54.4% moisture content of sphagnum peat The concentration of Dolomitic Limestone in mushroom casing mix is 3.25% by weight, at 54.4% moisture content of sphagnum peat At the average moisture content 54.4% of Sphagnum peat moss, the concentration of Wollastonite is 3.82% and 3.25% for dolomitic limestone on the weight basis. This concentration of Wollastonite and dolomitic limestone is depending on the moisture content of Sphagnum peat moss.

|  | Formulation | Unit of Measure | Converted to weight basis unit |
|---|---|---|---|
| Volumetric Component | 1 yd Peat Moss | Yard | 243 lb (at moisture 54.4%)/cubic yard = 144.1 kg/cubic meter |
| Value added Additives | 10 lb/CY Wollastonite | lb | 5.93 kg/cubic meter |
|  | 8.5 lb/CY Lime | lb | 5.04 kg/cubic meter |

From the foregoing and as mentioned above, it is observed that numerous variations and modifications ray be affected without departing from the spirit and scope of the novel concept of the invention. It is to be understood that no limitation with respect to the embodiments illustrated herein is intended or should be inferred.

I claim:

1. A mushroom casing mix comprising:
   a core material consisting of up to 100% sphagnum peat moss;
   a concentration mix comprising wollastonite and dolomitic limestone in a ratio of 10:8.5 per 1 yard of core material; and
   wherein the mushroom casing mix is configured to maintain a pH between 7.5 and 8.2 within 14 days after the concentration mix has being added to the core material.

2. The mushroom casing mix of claim 1, wherein the enhanced ability of the mushroom casing mix to maintain the pH range between 7.5 and 8.2 extends within 14 days after the concentration mix is added to at least 60 days after the concentration mix is added.

3. A mushroom casing mix comprising:
a core material consisting of up to 100% sphagnum peat moss;
a concentration mix comprising of wollastonite and dolomitic limestone, wherein when the moisture content of the core material is about 54.4% the concentration of wollastonite in the mushroom casing mix is about 3.82% by weight and the concentration of dolomitic limestone in the mushroom casing mix is about 3.25% by weight; and
wherein the mushroom casing mix is configured to maintain a pH between 7.5 and 8.2 within 14 days after the concentration mix has being added to the core material.

4. The mushroom casing mix of claim 2, wherein the enhanced ability of the mushroom casing mix to maintain the pH range between 7.5 and 8.2 extends from within 14 days after the concentration mix is added to at least 60 days after the concentration mix is added.

5. A method of reaching a pH range between 7.5-8.2 in a mushroom casing mix, comprising:
providing a core material of up to 100% sphagnum peat moss;
adding a concentration mix of wollastonite and dolomitic limestone; and
configuring the ratio of the wollastonite and dolomitic limestone at a ratio of 10:8.5 per 1 yard of core material to provide the mushroom casing mix with an enhanced ability to maintain a pH between 7.4 and 8.2 for a period of time after the concentration mix is added to the core material, and wherein the period of time is within 14 days to about at least 60 days.

6. A method of reaching a pH range between 7.5-8.2 in a mushroom casing mix, comprising:
providing a core material of up to 100% sphagnum peat moss;
adding a concentration mix of wollastonite and dolomitic limestone; and
wherein the core material is adjusted to have a moisture content of about 54.4%, and at this moisture content, the concentration of wollastonite in the mushroom casing mix is 3.82% by weight and the concentration of dolomitic limestone in the mushroom casing mix is about 3.25% by weight; and
wherein the mushroom casing mix is capable of maintaining a pH between 7.4 and 8.2 for a period of time after the concentration mix is added to the core material, and wherein the period of time is between 14 days to about at least 60 days.

\* \* \* \* \*